US011431751B2

(12) United States Patent
Patel et al.

(10) Patent No.: US 11,431,751 B2
(45) Date of Patent: Aug. 30, 2022

(54) LIVE FORENSIC BROWSING OF URLS

(71) Applicant: Microsoft Technology Licensing, LLC, Redmond, WA (US)

(72) Inventors: Amar Dinesh Patel, Issaquah, WA (US); John Lambert, Bellevue, WA (US); Nitin Kumar Goel, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 16/835,382

(22) Filed: Mar. 31, 2020

(65) Prior Publication Data

US 2021/0306375 A1 Sep. 30, 2021

(51) Int. Cl.
*H04L 9/40* (2022.01)
*G06F 16/955* (2019.01)
*G06F 9/455* (2018.01)

(52) U.S. Cl.
CPC ...... *H04L 63/1483* (2013.01); *G06F 9/45558* (2013.01); *G06F 16/955* (2019.01); *G06F 2009/45587* (2013.01)

(58) Field of Classification Search
CPC ............. H04L 63/1483; H04L 63/1416; H04L 63/1491; G06F 9/45558; G06F 16/955;
(Continued)

(56) References Cited

U.S. PATENT DOCUMENTS 8,468,597 B1 6/2013 Warner et al.
8,555,391 B1 10/2013 Ranadive et al.
(Continued)

FOREIGN PATENT DOCUMENTS

WO WO-2014035988 A1 * 3/2014 ............. G06F 21/53

OTHER PUBLICATIONS

Ieong et al.; "Deriving Cse-specific Live Forensics Investigation Procedures from FORZA", Mar. 2007, ACM, pp. 175-180. (Year: 2007).*
(Continued)

*Primary Examiner* — Matthew Smithers
(74) *Attorney, Agent, or Firm* — Ogilvie Law Firm

(57) ABSTRACT

Potentially malicious uniform resource locators and websites are safely and effectively investigated through live forensic browsing. Live data from an isolated browser feeds a security information and event management (SIEM) tool and other forensic tools during a browsing session, allowing investigators to direct the browsing in response to analysis results. Session data may be translated for SIEM ingestion. Browsing sessions may be manually or automatically customized to obscure their forensic nature, by routing selection, by bandwidth or latency adjustment, or by spoofing externally detectable characteristics such as geolocation, user agent, time zone, and language. Forensic activity by an investigator may also be obscured from discovery by an attacker as a result of spoofing the browser's context, such as plugin status and host machine physical characteristics. Human presence tests relied on by attackers may be satisfied without sacrificing a targeted system's cybersecurity or an investigator's access to forensic tools.

20 Claims, 6 Drawing Sheets

(58) Field of Classification Search
CPC ... G06F 2009/45587; G06F 2221/2127; G06F 21/53
See application file for complete search history.

(56) References Cited

U.S. PATENT DOCUMENTS

| | | | |
|---|---|---|---|
| 8,631,489 B2 | 1/2014 | Antonakakis et al. | |
| 9,930,065 B2 | 3/2018 | Nelms et al. | |
| 10,255,445 B1 | 4/2019 | Brinskelle | |
| 10,404,747 B1* | 9/2019 | Sela | H04L 63/0281 |
| 10,454,967 B1 | 10/2019 | Zaslavsky et al. | |
| 10,778,702 B1 | 9/2020 | Huang et al. | |
| 10,972,495 B2 | 4/2021 | Berlin | |
| 11,005,839 B1* | 5/2021 | Shahidzadeh | H04W 12/06 |
| 11,025,648 B2 | 6/2021 | Pereira et al. | |
| 11,070,646 B1 | 7/2021 | Lingafelt et al. | |
| 2002/0099952 A1 | 7/2002 | Lambert et al. | |
| 2002/0143813 A1 | 10/2002 | Jellum et al. | |
| 2003/0182549 A1 | 9/2003 | Hallin et al. | |
| 2003/0204425 A1 | 10/2003 | Kennedy et al. | |
| 2004/0139192 A1 | 7/2004 | Spaid | |
| 2004/0148170 A1 | 7/2004 | Acero et al. | |
| 2004/0162985 A1 | 8/2004 | Freeman et al. | |
| 2004/0164987 A1 | 8/2004 | Aronson et al. | |
| 2005/0021971 A1 | 1/2005 | Patankar et al. | |
| 2005/0122334 A1 | 6/2005 | Boyd et al. | |
| 2005/0210061 A1 | 9/2005 | Chang et al. | |
| 2005/0243094 A1 | 11/2005 | Patel et al. | |
| 2005/0251382 A1 | 11/2005 | Chang et al. | |
| 2005/0273335 A1 | 12/2005 | Chang et al. | |
| 2005/0273336 A1 | 12/2005 | Chang et al. | |
| 2005/0273771 A1 | 12/2005 | Chang et al. | |
| 2005/0289522 A1 | 12/2005 | Chang et al. | |
| 2007/0079358 A1 | 4/2007 | Lambert et al. | |
| 2007/0079372 A1 | 4/2007 | Lambert et al. | |
| 2007/0083912 A1 | 4/2007 | Lambert et al. | |
| 2007/0192855 A1 | 8/2007 | Hulten et al. | |
| 2008/0198169 A1 | 8/2008 | Boyd et al. | |
| 2008/0276316 A1 | 11/2008 | Roelker et al. | |
| 2009/0182550 A1 | 7/2009 | Alonichau et al. | |
| 2009/0187988 A1 | 7/2009 | Hulten et al. | |
| 2009/0281972 A1 | 11/2009 | Shahani et al. | |
| 2009/0320136 A1 | 12/2009 | Lambert et al. | |
| 2010/0153930 A1 | 6/2010 | Lambert et al. | |
| 2010/0185631 A1 | 7/2010 | Caldwell et al. | |
| 2010/0186088 A1 | 7/2010 | Banerjee et al. | |
| 2010/0251380 A1 | 9/2010 | Zhang et al. | |
| 2010/0306847 A1 | 12/2010 | Lambert et al. | |
| 2010/0325359 A1 | 12/2010 | Goel et al. | |
| 2010/0332601 A1 | 12/2010 | Walter et al. | |
| 2011/0154505 A1 | 6/2011 | Cowan et al. | |
| 2011/0191342 A1 | 8/2011 | Cohen et al. | |
| 2011/0191848 A1 | 8/2011 | Zorn et al. | |
| 2011/0234592 A1 | 9/2011 | Patel et al. | |
| 2011/0252476 A1 | 10/2011 | Loveland et al. | |
| 2011/0296524 A1 | 12/2011 | Hines et al. | |
| 2011/0302455 A1 | 12/2011 | Thomas et al. | |
| 2011/0314544 A1 | 12/2011 | Shin et al. | |
| 2012/0086715 A1 | 4/2012 | Patel et al. | |
| 2012/0158626 A1 | 6/2012 | Zhu et al. | |
| 2012/0271805 A1 | 10/2012 | Holenstein et al. | |
| 2012/0324568 A1 | 12/2012 | Wyatt et al. | |
| 2013/0111587 A1 | 5/2013 | Goel et al. | |
| 2014/0033307 A1 | 1/2014 | Schmidtler | |
| 2014/0122061 A1 | 5/2014 | Van Caldwell et al. | |
| 2014/0172813 A1 | 6/2014 | Fan et al. | |
| 2014/0237607 A1 | 8/2014 | Lambert et al. | |
| 2014/0359760 A1 | 12/2014 | Gupta et al. | |
| 2014/0365443 A1 | 12/2014 | Goel et al. | |
| 2014/0368523 A1 | 12/2014 | Patel et al. | |
| 2015/0006159 A1 | 1/2015 | Cai et al. | |
| 2015/0091931 A1 | 4/2015 | Pelton et al. | |
| 2015/0143525 A1 | 5/2015 | Naldurg et al. | |
| 2015/0172311 A1* | 6/2015 | Freedman | H04L 63/20 726/1 |
| 2015/0326521 A1 | 11/2015 | Osipkov et al. | |
| 2016/0014081 A1 | 1/2016 | Don et al. | |
| 2016/0055555 A1 | 2/2016 | Mills et al. | |
| 2016/0071230 A1 | 3/2016 | Patel et al. | |
| 2016/0071315 A1 | 3/2016 | Cohen et al. | |
| 2016/0173434 A1 | 6/2016 | Midgen et al. | |
| 2016/0191548 A1* | 6/2016 | Smith | H04L 63/1416 726/23 |
| 2017/0061662 A1 | 3/2017 | Pelton et al. | |
| 2017/0109259 A1 | 4/2017 | Lewis et al. | |
| 2017/0109379 A1 | 4/2017 | Crawford et al. | |
| 2017/0109380 A1 | 4/2017 | Crawford et al. | |
| 2017/0109927 A1 | 4/2017 | Patel et al. | |
| 2017/0185895 A1 | 6/2017 | Chen et al. | |
| 2017/0187782 A1 | 6/2017 | Crawford et al. | |
| 2017/0373943 A1 | 12/2017 | Goel et al. | |
| 2018/0063168 A1 | 3/2018 | Sofka | |
| 2018/0089164 A1 | 3/2018 | Iida et al. | |
| 2018/0095805 A1 | 4/2018 | Patel et al. | |
| 2018/0191778 A1 | 7/2018 | Volkov | |
| 2018/0205691 A1 | 7/2018 | Osipkov et al. | |
| 2018/0213000 A1 | 7/2018 | Patel et al. | |
| 2018/0248904 A1* | 8/2018 | Villella | G06N 20/10 |
| 2018/0351972 A1 | 12/2018 | Yu et al. | |
| 2018/0367548 A1 | 12/2018 | Stokes et al. | |
| 2019/0014149 A1 | 1/2019 | Cleveland et al. | |
| 2019/0019058 A1 | 1/2019 | Woodbridge et al. | |
| 2019/0028557 A1* | 1/2019 | Modi | G06N 3/04 |
| 2019/0122258 A1 | 4/2019 | Bramberger et al. | |
| 2019/0236095 A1 | 8/2019 | Achan et al. | |
| 2019/0259084 A1 | 8/2019 | Guo et al. | |
| 2019/0272664 A1 | 9/2019 | Kinross et al. | |
| 2020/0027190 A1 | 1/2020 | Kinross et al. | |
| 2020/0076837 A1* | 3/2020 | Ladnai | H04L 63/1425 |
| 2020/0112571 A1 | 4/2020 | Koral et al. | |
| 2020/0112574 A1 | 4/2020 | Koral et al. | |
| 2020/0167643 A1 | 5/2020 | Bivens et al. | |
| 2020/0195669 A1 | 6/2020 | Karasaridis et al. | |
| 2020/0311766 A1* | 10/2020 | Shiravi Khozani | G06F 21/53 |
| 2020/0349430 A1 | 11/2020 | Schmidtler et al. | |
| 2020/0358799 A1 | 11/2020 | Boyer et al. | |
| 2020/0358819 A1 | 11/2020 | Bowditch et al. | |
| 2020/0401696 A1 | 12/2020 | Ringlein et al. | |
| 2021/0019304 A1 | 1/2021 | Nahumi et al. | |
| 2021/0021612 A1 | 1/2021 | Higbee et al. | |
| 2021/0049441 A1 | 2/2021 | Bronstein | |
| 2021/0065872 A1 | 3/2021 | Whalen et al. | |
| 2021/0097168 A1 | 4/2021 | Patel et al. | |
| 2021/0120013 A1 | 4/2021 | Hines et al. | |
| 2021/0281606 A1 | 9/2021 | Singh et al. | |

OTHER PUBLICATIONS

Kelly et al.; "FIRST: Forensic Internet Replay Sequencing Tool", 2009, IEEE, pp. 270-273. (Year: 2009).*

Ahmed et al.; "An Automated User Transparent Approach to log Web URLs for Forensic Analysis", 2009, IEEE, pp. 120-127. (Year : 2009).*

"International Search Report and Written Opinion Issued in PCT Application No. PCT/US21/016270", dated Jun. 21, 2021, 19 Pages.

"Context-free Grammar", Retrieved From: https://en.wikipedia.org/wiki/Context-free_grammar, Sep. 5, 2019, 18 Pages.

"Databricks", Retrieved From: https://en.wikipedia.org/wiki/Databricks, Sep. 20, 2019, 2 Pages.

"Domain Generation Algorithm", Retrieved From: https://en.wikipedia.org/wiki/Domain_generation_algorithm, Jul. 2, 2019, 3 Pages.

"Homoglyph", Retrieved From: https://en.wikipedia.org/wiki/Homoglyph, Aug. 27, 2019, 4 Pages.

"How to Check Whether a String is Base64 Encoded or Not", Retrieved From: https://stackoverflow.com/questions/8571501/how-to-check-whether-a-string-is-base64-encoded-or-not, Aug. 30, 2018, 20 Pages.

"Keras", Retrieved From: https://en.wikipedia.org/wiki/Keras, Sep. 13, 2019, 3 Pages.

"Markov Chain", Retrieved From: https://en.wikipedia.org/wiki/Markov_chain, Sep. 13, 2019, 27 Pages.

(56) References Cited

OTHER PUBLICATIONS

"Microsoft Cognitive Toolkit", Retrieved From: https://en.wikipedia.org/wiki/Microsoft_Cognitive_Toolkit, Sep. 12, 2019, 1 Page.
"Punycode", Retrieved From: https://en.wikipedia.org/wiki/Punycode, May 1, 2019, 4 Pages.
"Regular Expression", Retrieved From: https://en.wikipedia.org/wiki/Regular_expression, Sep. 18, 2019, 29 Pages.
"String Metric", Retrieved From: https://en.wikipedia.org/wiki/String_metric, Jun. 3, 2019, 3 Pages.
"TrustedSource", Retrieved From: https://en.wikipedia.org/wiki/TrustedSource, Aug. 6, 2019, 2 Pages.
"What is Sandboxing?", Retrieved From: https://www.barracuda.com/glossary/sandboxing, Retrieved Date: Aug. 22, 2019, 3 Pages.
Anderson, "Using Deep Learning to Detect DGAs", Retrieved From: https://www.elastic.co/blog/using-deep-learning-detect-dgas, Nov. 18, 2016, 6 Pages.
Buber, Ebubekir, "Phishing URL Detection with ML", Retrieved From: https://towardsdatascience.com/phishing-domain-detection-with-ml-5be9c99293e5, Feb. 8, 2018, 12 Pages.
Krebs, Brian, "Look-Alike Domains and Visual Confusion", Retrieved From: https://krebsonsecurity.com/2018/03/look-alike-domains-and-visual-confusion/, Mar. 8, 2018, 17 Pages.
Nohe, Patrick, "Nearly 21% of the World's Top 100,000 Websites Still Aren't Using HTTPS", Retrieved From: https://www.thesslstore.com/blog/nearly-21-of-the-worlds-top-100000-websites-still-arent-using-https/, Dec. 12, 2018, 9 Pages.
Sahoo, et al., "Malicious URL Detection Using Machine Learning: A Survey", In Repository of arXiv:1701.07179, Aug. 21, 2019, 37 Pages.
Salgado, H., "The "hxxp" and "hxxps" URI Schemes", Retrieved From: https://tools.ietf.org/id/draft-salgado-hxxp-01.xml, 2017, 7 Pages.
Schonning, et al., "Memory-Mapped Files", Retrieved From: https://docs.microsoft.com/en-us/dotnet/standard/io/memory-mapped-files, Mar. 30, 2017, 10 Pages.
Woodbridge, et al., "Predicting Domain Generation Algorithms with Long Short-Term Memory Networks", in Repository of arXiv: 1611.00791, Nov. 2, 2016, 13 Pages.
"Cyren Sandboxing", retrieved from <<https://www.cyren.com/tl_files/downloads/resources/Cyren_Datasheet_SaaSSandboxing_20180308_ltr_EN_web.pdf>>, 2018, 2 pages.
"Evolving Office 365 Advanced Threat Protection with URL Detonation and Dynamic Delivery", retrieved from <<https://www.microsoft.com/en-us/microsoft-365/blog/2017/01/25/evolving-office-365-advanced-threat-protection-with-url-detonation-and-dynamic-delivery/>>, Jan. 25, 2017, 10 pages.
"Any.run—Interactive Online Malware Sandbox", retrieved from <<https://any.run/>>, 2019, 6 pages.
"Free Online Sandbox FAQ", retrieved from <<https://www.splunk.com/en_us/products/premium-solutions/splunk-enterprise-security/online-sandbox-faq.html>>, no later than Feb. 24, 2020, 3 pages.
Rohan Viegas, "How Malware Sandboxes and SIEMs Work in Tandem to Effectively Detect Malware", retrieved from <<https://cybersecurity.att.com/blogs/security-essentials/how-malware-sandboxes-and-siems-work-in-tandem-to-effectively-detect-malware>>, Dec. 27, 2018, 3 pages.
"Enable SIEM integration in Microsoft Defender ATP", retrieved from <<https://docs.microsoft.com/en-us/windows/security/threat-protection/microsoft-defender-atp/enable-siem-integration>>, Dec. 10, 2019, 4 pages.
"Understanding IP Address Geolocation", retrieved from <<https://support.authentic8.com/support/solutions/articles/16000027683-understanding-ip-address-geolocation>>, Apr. 18, 2019, 5 pages.
Skulkin, et al., "An Overview of Web Browser Forensics", retrieved from <<https://www.digitalforensics.com/blog/an-overview-of-web-browser-forensics/>>, no later than Mar. 2, 2020, 14 pages.
"Proofpoint Browser Isolation", retrieved from <<https://www.proofpoint.com/sites/default/files/pfpt-us-ds-browser-isolation.pdf>>, Nov. 2019, 2 pages.
"Web Isolation", retrieved from <<https://www.broadcom.com/products/cyber-security/web-and-email/gateway/web-isolation>>, no later than Mar. 4, 2020, 4 pages.
"Adaptive Clientless Rendering", retrieved from <<https://www.menlosecurity.com/adaptive-clientless-rendering>>, no later than Mar. 4, 2020, 5 pages.
Darren Remington, "Cloudflare + Remote Browser Isolation", retrieved from <<https://blog.cloudflare.com/cloudflare-and-remote-browser-isolation/>>, Jan. 7, 2020, 14 pages.
"Request for Information (RFI) for Cloud Based Internet Isolation Solution", retrieved from <<https://insidecybersecurity.com/sites/insidecybersecurity.com/files/documents/2018/aug/cs2018_0376.pdf>>. Aug. 2018, 4 pages.
Shaun Waterman, "Isolating browsers from the web's 'cesspool': Why Symantec bought FireGlass", retrieved from <<https://www.cyberscoop.com/symantec-fireglass-browser-isolation/>>, Jul. 10, 2017, 8 pages.
"Remote Browser Isolation—A Guide to the Vendors in the Market", retrieved from <<https://www.secjuice.com/remote-browser-isolation-vendors/>>, Jun. 28, 2018, 11 pages.
"Symantec Full Web Isolation—Initial Cloud Service Subscription (1 year) +", retrieved from <<https://m.cdw.com/product/Symantec-Full-Web-Isolation-Initial-Cloud-Service-Subscription-1-year/4877965>>, no later than Mar. 4, 2020, 3 pages.
"Proofpoint Security and Compliance Price List", retrieved from <<http://www.cybersecuritypricing.org/proofpoint-security-and-compliance-price-list/>>, no later than Mar. 4, 2020, 1 page excerpt.
"Proofpoint—PP-M-PWD-S-A-105—Pfpt Personal Webmail Def-s 1001 to 2000 12", retrieved from <<https://www.neobits.com/proofpoint_pp_m_pwd_s_a_105_pfpt_personal_webmail_p12232805.html>>, no later than Mar. 4, 2020, 3 pages.
"User Guide: TrustedProxies GeoSet Toolbar", retrieved from <<https://customers.trustedproxies.com/index.php?rp=/knowledgebase/42/User-Guide-TrustedProxies-GeoSet-Toolbar.html>>, no later than Mar. 6, 2020, 9 pages.
"Proxify® Services", retrieved from <<https://proxify.com/services.shtml>>, no later than Mar. 6, 2020, 1 page.
"Honeypot (computing)", retrieved from <<https://en.wikipedia.org/wiki/Honeypot_(computing)>>, Feb. 26, 2020, 6 pages.
Thomas Roccia, et al., "Evolution of Malware Sandbox Evasion Tactics—A Retrospective Study", retrieved from <<https://www.mcafee.com/blogs/other-blogs/mcafee-labs/evolution-of-malware-sandbox-evasion-tactics-a-retrospective-study/>>, Sep. 9, 2019, 18 pages.
"Security information and event management", retrieved from <<https://en.wikipedia.org/wiki/Security_information_and_event_management>>, Feb. 12, 2020, 4 pages.
"Gather any web data, from any website", retrieved from <<https://luminati.io/>>, no later than Mar. 28, 2020, 9 pages.
"Non Final Office Action Issued in U.S. Appl. No. 16/584,658", dated Nov. 12, 2021, 14 Pages.
"Final Office Action Issued in U.S. Appl. No. 16/584,658", dated Feb. 3, 2022, 15 Pages.
Mamun, et al., "Detecting Malicious URLs Using Lexical Analysis", in International Conference on Network and System Security, Sep. 21, 2016, pp. 467-482.
"International Search Report and Written Opinion Issued in PCT Application No. PCT/US20/038275", dated Sep. 14, 2020, 12 Pages.
Rao, et al., "CatchPhish: detection of phishing websites by inspecting URLs", in Journal of Ambient Intelligence and Humanized Computing, vol. 11, Issue 2, May 10, 2019, pp. 813-825.
Hirotomo, et al., "Efficient Method for Analyzing Malicious Websites by Using Multi-Environment Analysis System", in Proceedings of 12th Asia Joint Conference on Information Security, Aug. 10, 2017, pp. 48-54.
Nazario, Jose, "PhoneyC: A Virtual Client Honeypot", in Proceedings of the 2nd USENIX Conference on Large-Scale Exploits and Emergent Threats: Botnets, Spyware, Worms, and More, Apr. 1, 2009, 8 Pages.
"Invitation to Pay Additional Fees issued in PCT Application No. PCT/US21/016270", dated Apr. 30, 2021, 14 Pages.

(56) References Cited

OTHER PUBLICATIONS

Bhattacharjee, et al., "Prioritized Active Learning for Malicious URL Detection using Weighted Text-Based Features", in Proceedings of IEEE International Conference on Intelligence and Security Informatics (ISI), Jul. 22, 2017, pp. 107-112.

Lison, et al., "Neural Reputation Models Learned from Passive DNS Data", in Proceedings of IEEE International Conference on Big Data (Big Data), Dec. 11, 2017, pp. 3662-3671.

"International Search Report and Written Opinion Issued in PCT Application No. PCT/US20/054658", dated Date Dec. 16, 2020, 14 Pages.

"Non Final Office Action Issued in U.S. Appl. No. 16/658,037", dated Mar. 11, 2022, 39 Pages.

"Notice of Allowance Issued in U.S. Appl. No. 16/584,658", dated Mar. 21, 2022, 9 Pages.

"Final Office Action Issued in U.S. Appl. No. 16/658,037", dated May 2, 2022, 53 Pages.

\* cited by examiner

SOME EXAMPLES OF EXTERNALLY DETECTABLE CHARACTERISTICS 218

| BROWSER USER AGENT 702 INFORMATION 704 | | BROWSER LANGUAGE 706 PREFERENCE 708 |
|---|---|---|
| COMPATIBILITY INDICATION 710 | BROWSER SETTTING 712 | IP ADDRESS 714 OR IP ADDRESS RANGE 716 |
| GEOLOCATION 718 INFORMATION 720 | ROUTE 722 | INSTALLATION STATUS 724 OF BROWSER PLUGIN 726 |
| PHYSICAL CHARACTERISTIC 728 OF BROWSER'S COMPUTING SYSTEM 202 | | |

Fig. 7

SOME ADDITIONAL ASPECTS 800 OF SOME SYSTEMS 202 OR SESSIONS 208

| INTERACTION 802 | FORENSIC SENSOR 804 | PROXY SERVICE 806 |
|---|---|---|
| BANDWIDTH 808 | CLOUD 810 | ANONYMIZATION SERVICE 812 |
| THROUGHPUT 814 | FORENSIC ANALYSIS MACHINE LEARNING MODEL 816 | |
| LATENCY 818 | PACKET 418 CAPTURE / INSPECTION 420 / 820 TOOL 820 | |
| SUSPECT BEHAVIOR 822 | SESSION CHARACTERISTIC VALUE 824 | |

Fig. 8

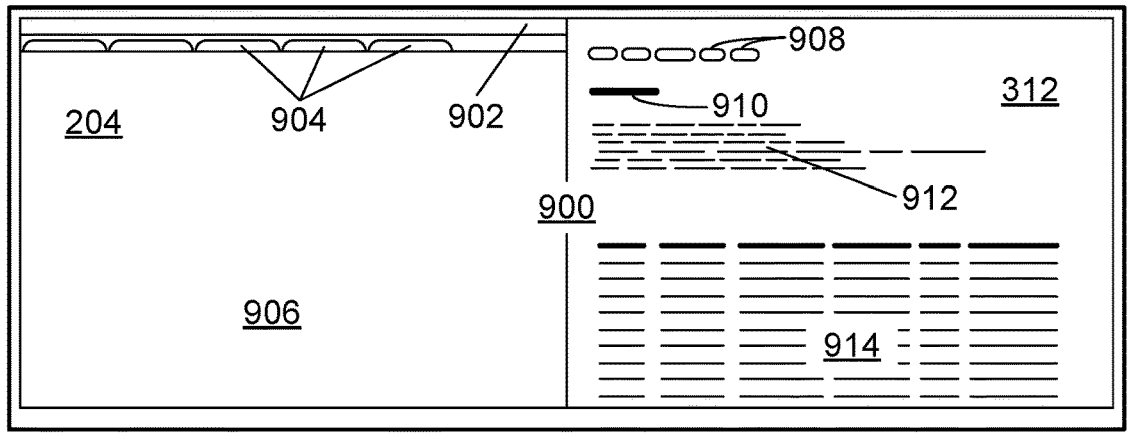

Fig. 9

LIVE FORENSIC BROWSING OF URLS

BACKGROUND

Attacks on computing systems take many different forms, including some forms which are difficult to predict, and forms which may vary from one situation to another. However, many cyberattacks make use of uniform resource locators (URLs), which are sometimes also called "hyperlinks" or simply "links". Phishing cyberattacks, for example, are often designed to urge or entice a potential victim to follow a URL to a malicious website, such as a fake banking or credit card site that collects usernames and passwords. Clicking on a malicious hyperlink may also take a user to a site that downloads ransomware, spyware, or other malware onto the user's device. Accordingly, technical advances that reduce the risk of damage or loss due to malicious URLs would be helpful.

Incidentally, "URL" is sometimes pronounced to rhyme with "pearl" and sometimes pronounced as a sequence of letters U-R-L. Either pronunciation may be used with the present disclosure.

SUMMARY

Some embodiments described in this document provide improved technology for safely and effectively investigating the results of following a potentially malicious uniform resource locator (URL). In particular, some embodiments combine sandboxed browsers or other isolated browsers with forensic capabilities, such as a live data feed to a security information and event management (SIEM) tool or other forensic tools. Some embodiments allow browsing sessions to be customized in ways that obscure the forensic nature of the sessions, so that cyberattackers will proceed as if they've found a naïve victim instead of the cyberdefense personnel and tools they are actually facing.

Some embodiments use or provide a live forensic browsing hardware and software combination which includes a digital memory, a browser, an interface to a forensic tool such as an interactive SIEM, and a processor which is in operable communication with the memory. The processor is configured, e.g., by tailored software, to perform certain steps for live forensic browsing of a URL in a browsing session of the browser. The steps include (a) spoofing at least one externally detectable characteristic of the browsing session, (b) collecting forensic data from the browsing session while executing the browsing session, and (c) supplying at least a portion of the collected forensic data to the SIEM via the SIEM interface while executing the browsing session. Such an embodiment supports interactive investigation of suspicious computational behavior through a forensic analysis of live forensic data, particularly when the live forensic data is at least partially dependent on the URL and at least partially dependent on the spoofing.

Some embodiments use or provide steps for live forensic browsing of a URL, including: executing a browsing session of a browser in a computing system, the browser receiving live input from a human user during the browsing session, automatically collecting forensic data from the browsing session during the browsing session, and automatically supplying at least a portion of the collected forensic data to a SIEM or other forensic tool during the browsing session as live forensic data. Such an embodiment supports interactive investigation of suspicious computational behavior through a forensic analysis of the live forensic data, particularly when the live forensic data is at least partially dependent on the URL and at least partially dependent on the live input.

Some embodiments use or provide a computer-readable storage medium configured with data and instructions which upon execution by a processor cause a computing system to perform live forensic browsing of a URL. The live forensic browsing includes: executing a browsing session of a browser in a computing system, including at least following the URL, customizing at least one externally detectable characteristic of the browsing session, automatically collecting forensic data from the browsing session during the browsing session, and automatically supplying at least a portion of the collected forensic data to a SIEM or other forensic tool during the browsing session as live forensic data. Such an embodiment supports interactive professional investigation of suspicious computational behavior through a forensic analysis of the live forensic data, particularly when the live forensic data is at least partially dependent on the URL and at least partially dependent on a result of the customizing.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 7 is a block diagram illustrating some examples of externally detectable characteristics of a browsing session;

FIG. 8 is a block diagram illustrating some additional aspects of some systems or some browsing sessions;

FIG. 9 is a stylized representation of an example of a user interface that is suitable for live forensic browsing;

DETAILED DESCRIPTION

Overview

Innovations may expand beyond their origins, but understanding an innovation's origins can help one more fully appreciate the innovation. In the present case, some teachings described herein were motivated by technical challenges faced by Microsoft innovators who were working to improve the usability of Microsoft cybersecurity offerings.

In particular, a technical challenge was to how to help security analysts who are working for a corporation, government agency, educational institution, or other enterprise effectively investigate URLs that either are suspect or are known to be malicious, without unduly risking the security of their enterprise's network. Even more particularly, the innovators faced the technical challenges of investigating cyberattack behavior which varies depending on whether the attack detects the investigation. For example, some attacks check for human presence and then avoid malicious steps when no human presence is detected, on the assumption that the attack is operating in an automated security environment rather than operating against a potential human victim. Also, some attacks check for indications that a browsing session is taking place in a sandbox, e.g., in an isolated virtual machine, as opposed to taking place on a victim's laptop or smartphone or workstation. If a sandbox is detected, then the attack hides its malicious nature, e.g., by not installing malware or by not redirecting web navigation to a fake site where login credentials would be stolen.

Other technical challenges are also addressed by teachings herein. For example, with the benefit of hindsight it became apparent to the innovators that although the operation of an isolated or otherwise secured web browser could generate useful forensic information about an attack, the usefulness of that information was unnecessarily constrained. The forensic information obtained while browsing was ephemeral and limited to the particular browsing session, making investigative insights similarly limited.

Accordingly, the innovators faced and addressed technical challenges involved in making the forensic data that is generated by a browsing session available for analysis with forensic tools outside the browser. They concluded that simply logging session activity and then importing the log into a forensic tool after the browsing session is completed severely limits an investigator's ability to gain insight through forensic tools and to effectively guide subsequent operations in the browser that could reveal the structures, assumptions, and internal operations of a cyberattack. Accordingly, secure web browsing with concurrent forensic analysis performed during the browsing is taught herein, using live forensic data, in a loop that gives investigators the benefits of forensic tools as they browse.

Other aspects of these embodiments, and other live forensic browsing enhancement embodiments, are also described herein.

Operating Environments

Figure 1:
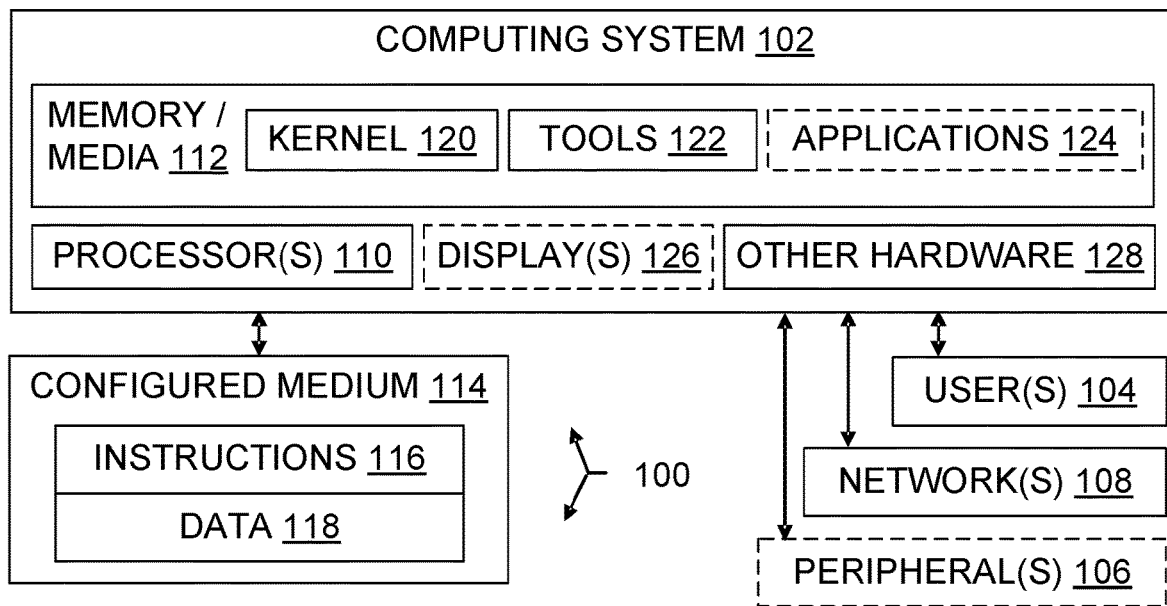
FIG. 1 is a block diagram illustrating computer systems generally and also illustrating configured storage media generally.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, live forensic browsing functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
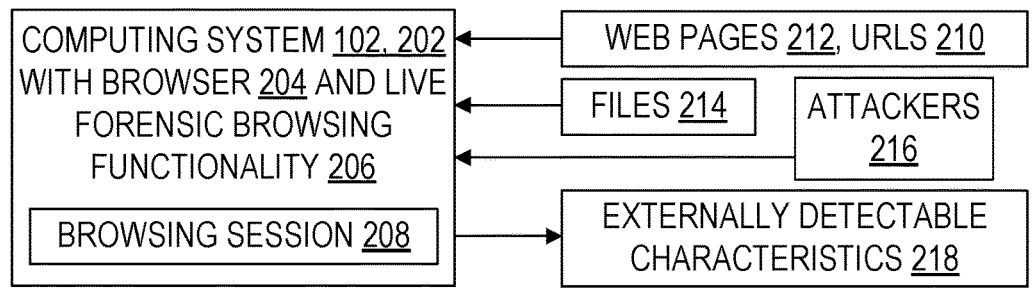
FIG. 2 is a block diagram illustrating a computing system equipped with live forensic browsing functionality, and some aspects of a surrounding context.

FIG. 2 illustrates an environment having an enhanced system 202, 102 that includes an isolated, sandboxed, or otherwise secured browser 204 and other live forensic browsing functionality 206. During operation of the live forensic browsing functionality 206, a browsing session 208 is controlled at least in part through the browser 204. The browser may follow URLs 210 to visit web pages 212, and may download other files 214 such as scripts, executable code, images, sound recordings, video recordings, and certificates, to name a few examples. Some of the URLs 210, web pages 212, or files 214 may be malicious in the sense that they implement attempts by cyberattackers 216 to infiltrate or modify or control the system 202 hardware or the data 118 thereon. Attackers 216 and their malware or other tools may behave differently, depending on which external characteristics 218 of the browsing session per se or of the underlying computer system 202 are detected by the tools.

The attackers 216 often reside outside a network 108 boundary that is defined, e.g., by firewalls. But teachings herein may also be advantageously applied to perform live forensic browsing of attacks that are perpetrated by insider attackers 216. Similarly, the system 202 may communicate with a separately located cybersecurity center (not shown), while in other environments an enhanced system 202 resides inside the cybersecurity center, and in still others the enhanced system 202 operates without any cybersecurity center per se.

Figure 3:
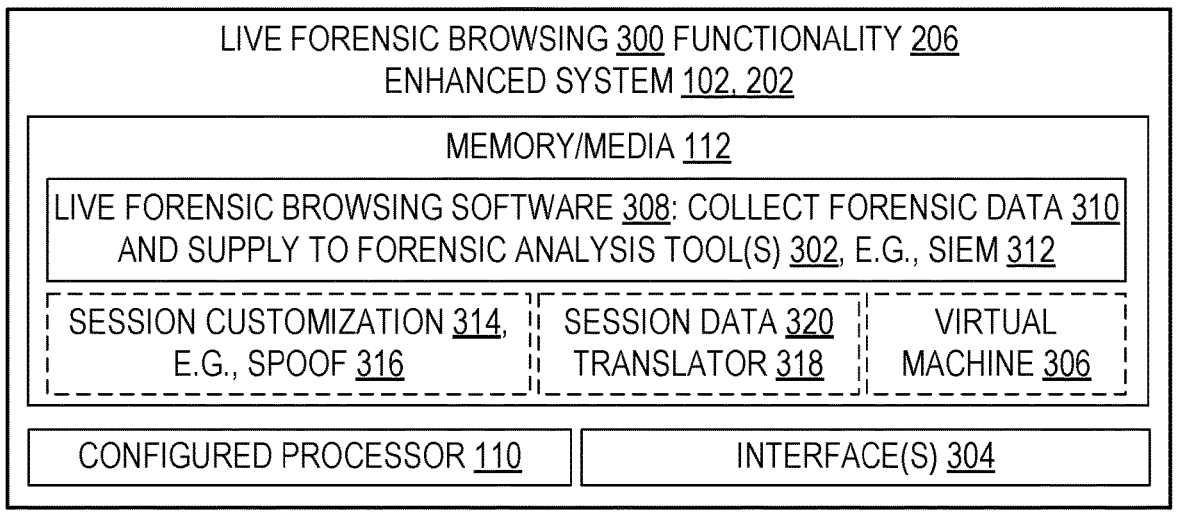
FIG. 3 is a block diagram illustrating an enhanced system configured with live forensic browsing functionality.

FIG. 3 illustrates an enhanced system 202 which is configured with functionality 206 for performing live forensic browsing 300. The system 202 may be networked generally or communicate in particular (via network or otherwise) with forensic analysis tools 302 through one or more interfaces 304. The browser 204, and in some configurations other parts of the system 202, may execute within a virtual machine or container 306. The illustrated system 202 includes live forensic browsing software 308 to perform computations that collect forensic data 310 and feed it to a security information and event management tool (SIEM) 312 or other forensic analysis tools 302. For example, the software 308 may perform a method 1200 illustrated in FIG. 12 or FIG. 11 or both. In some embodiments, the software 308 may perform browsing session customization 314, e.g., by route selection or by characteristic value 824 spoofing 316, 1104. In some embodiments, the software 308 may translate 318 session data 320 from a browser format to a SIEM ingestion format.

Figure 4:
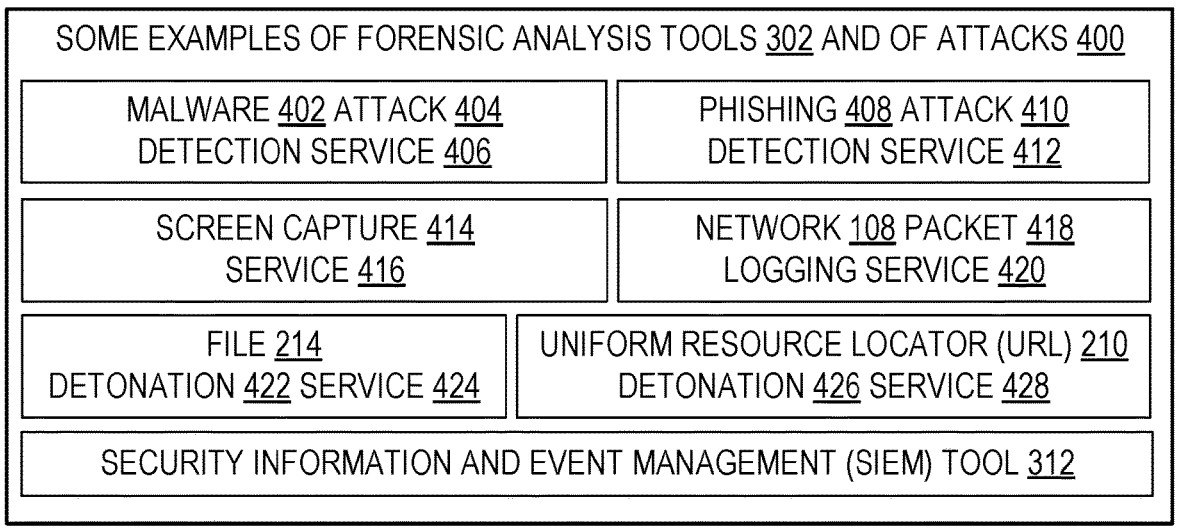
FIG. 4 is a block diagram illustrating some examples of forensic analysis tools.

FIG. 4 illustrates several examples of forensic analysis tools 302 and related aspects of cyberattacks 400. These items are discussed at various points herein, and additional details regarding them are provided in the discussion of a List of Reference Numerals later in this disclosure document.

Figure 5:
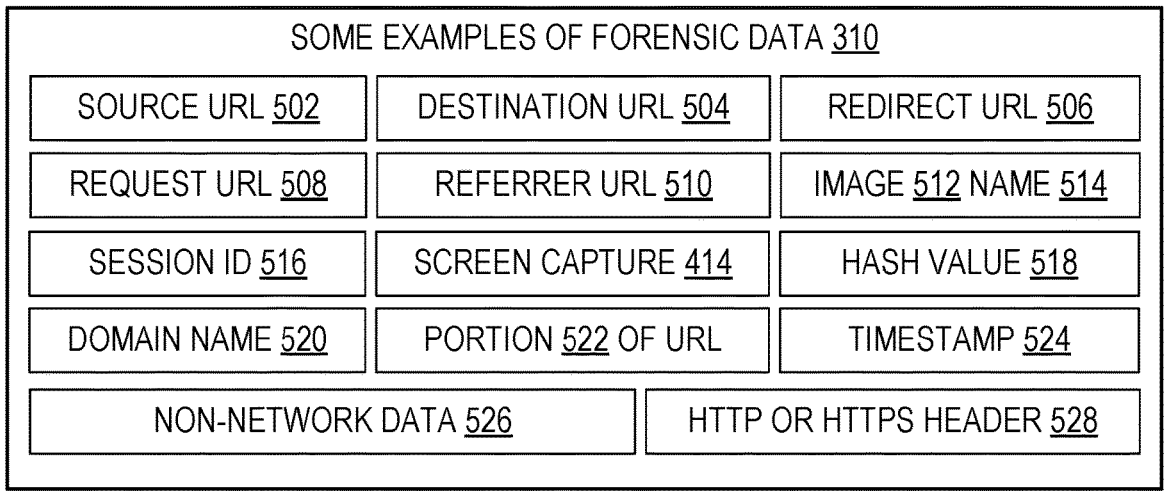
FIG. 5 is a block diagram illustrating some examples of forensic data.

FIG. 5 shows some examples of forensic data 310. These items are discussed at various points herein, and additional details regarding them are provided in the discussion of a List of Reference Numerals later in this disclosure document.

Figure 6:
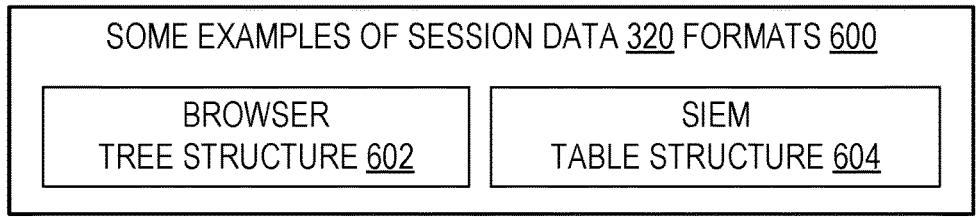
FIG. 6 is a block diagram illustrating some examples of browsing session data formats.

FIG. 6 shows two examples of session data 320 formats 600, namely, a browser tree structure 602 and a SIEM table structure 604. In a browser 204, data generated by visiting a URL may often be represented as a tree structure, particularly for a phishing analysis, as illustrated in the following example:

Uri: http://bit.ly/abcdef
   RedirectedUrl: https://compromised.com
      Certificate:
         Signed by: ISP-X
         Expires on: 2021 Jan. 1
      Frames:
         Frame 1:
            Frame Url: https://evil.realm
            Certificate:
               Signed by: Lets Encrypt
               Expires on: 2020 Apr. 1
            Images:
               Image 1:
                  Source:
                  https://contoso.com/app1/hero.png
            Scripts:
               Script 1:
                  Source: https://evil.realm/bad.js
            Forms:
               Form 1:
                  Action: https://evil.realm/postback.php
                  Inputs:
                     Input 1:
                        Type: Text
                        Default Value:
                        user@email.com
                     Input 2:
                        Type: Password
            Text Segments:
               Text Segment 1:
                  Text: Welcome to App1
               Text Segment 2:
                  Text: Copyright Contoso 2020
               Text Segment 3:
                  Text: Enter your home or work account However, many SIEMs don't store data as such as tree structure; instead, they store flat tables. Accordingly, the session data translator 318 of some embodiments translates session data 320 from the tree structure 602 into a table structure 604 that contains a flat sequence of virtual events which build up the same context incrementally. For the example above, this translation may produce a tabular structure 604 such as the one in the following example:

| Page URL | Frame URL | Event Type | URL | Text | Input Type |
|---|---|---|---|---|---|
| http://bit.ly/abcdef | | redirect | https://compromised.com | | |
| https://compromised.com | | frame load | https://evil.realm | | |
| | https://evil.realm | image ref | https://contoso.com/app1/hero.png | | |
| | https://evil.realm | script ref | https://evil.realm/bad.js | | |
| | https://evil.realm | form input added | user@email.com | | text |
| | https://evil.realm | form input added | | | password |
| | https://evil.realm | text segment added | | Welcome to App1 | |
| | https://evil.realm | text segment added | | Copyright Contoso 2020 | |
| | https://evil.realm | text segment added | | Enter your home or work account | |

One of skill will understand that the structures above are merely examples. Other suitable tree structures 602 may have different node values, and not every action during a browsing session 208 will necessarily be captured in a tree structure for that session. Likewise, other suitable table structures 604 may have different columns, e.g., the example table structure 604 may have columns not shown here, such as columns for a Timestamp, Sequence ID, Certificate Signed By, Certificate Expiry, Session ID, Session Sequence Number, Main Frame URL, Referrer URL, Transition Type (e.g., link, explicit), Resource Type (e.g., main frame, image, script, font, stylesheet), Request Method (e.g., GET, POST), Request Header, Response Header, Response Status (e.g., failure, success), Response Status Code (e.g., 200), Response Error Reason (e.g., none, name-not-resolved, cache-miss), Response Content Length, Response Content Type (e.g., image/png, application/javascript, font/woff, image/jpeg, text/css, text/html), Response Content Hash (e.g., SHA256 hash value), or data illustrated in any of FIG. 5, 7, 8, or 9, or some combination thereof.

FIG. 7 shows some examples of externally detectable characteristics 218. These items are discussed at various points herein, and additional details regarding them are provided in the discussion of a List of Reference Numerals later in this disclosure document.

FIG. 8 shows some additional aspects 800 of some enhanced systems 202 or some browsing sessions 208. These items are discussed at various points herein, and additional details regarding them are provided in the discussion of a List of Reference Numerals later in this disclosure document.

FIG. 9 illustrates one of many possible user interfaces 900 for live forensic browsing software 308. In this example, a browser 204 interface is on the left, and a SIEM 312 interface is on the right.

The illustrated browser 204 interface includes features such as an address bar 902, tabs 904, and page display area 906. One or more other browser user interface items such as forward and reverse arrow buttons, favorites lists, command menus, HTTPS indicator icons, a home page button, and the like are not shown but may be present in a given embodiment. The underlying browser itself is isolated, sandboxed, or otherwise secured, and is enhanced with interface(s) 304 to one or more forensic tools 302 such as the SIEM 312 to supply live forensic data directly to those tools during a browsing session 208. An interface 304 may be implemented using, e.g., an API, signals, packets, remote procedure calls, or other digital data communication mechanism.

The format translator 318 may be positioned to receive forensic data 310, 602 from the browser interface, translate it, and then forward translated data 310, 604 to the SIEM. In some embodiments, data 310 also flows from the SIEM to the enhanced browser, possibly via software 308, to customize 314 the browser based on values 310, 824 extracted from logs by the SIEM.

The illustrated SIEM 312 interface includes features such as command buttons 908 (e.g., pause, save, delete, elevate to alert rule, add bookmark), an input stream name or other input source identification 910, a query history 912, query results 914 such as a tabular presentation of events with corresponding column titles (e.g., domain name, image name, session ID, hash value, event date and time, main frame URL, etc. consistent with the discussion of the table structure 604), and other forensic information. The underlying SIEM may include commercially available software such as a Microsoft Azure® Sentinel™ SIEM, a Splunk® SIEM, a SolarWinds® SIEM, or the like (Azure and Sentinel are marks of Microsoft Corporation, Splunk is a mark of Splunk, Inc., and SolarWinds is a mark of SolarWinds.Net Corporation). The SIEM may be enhanced with an interface 304 to receive live data 310, and may be enhanced with software 308 to extract one or more characteristic values 824 and to use them in session customization 314.

Figure 10:
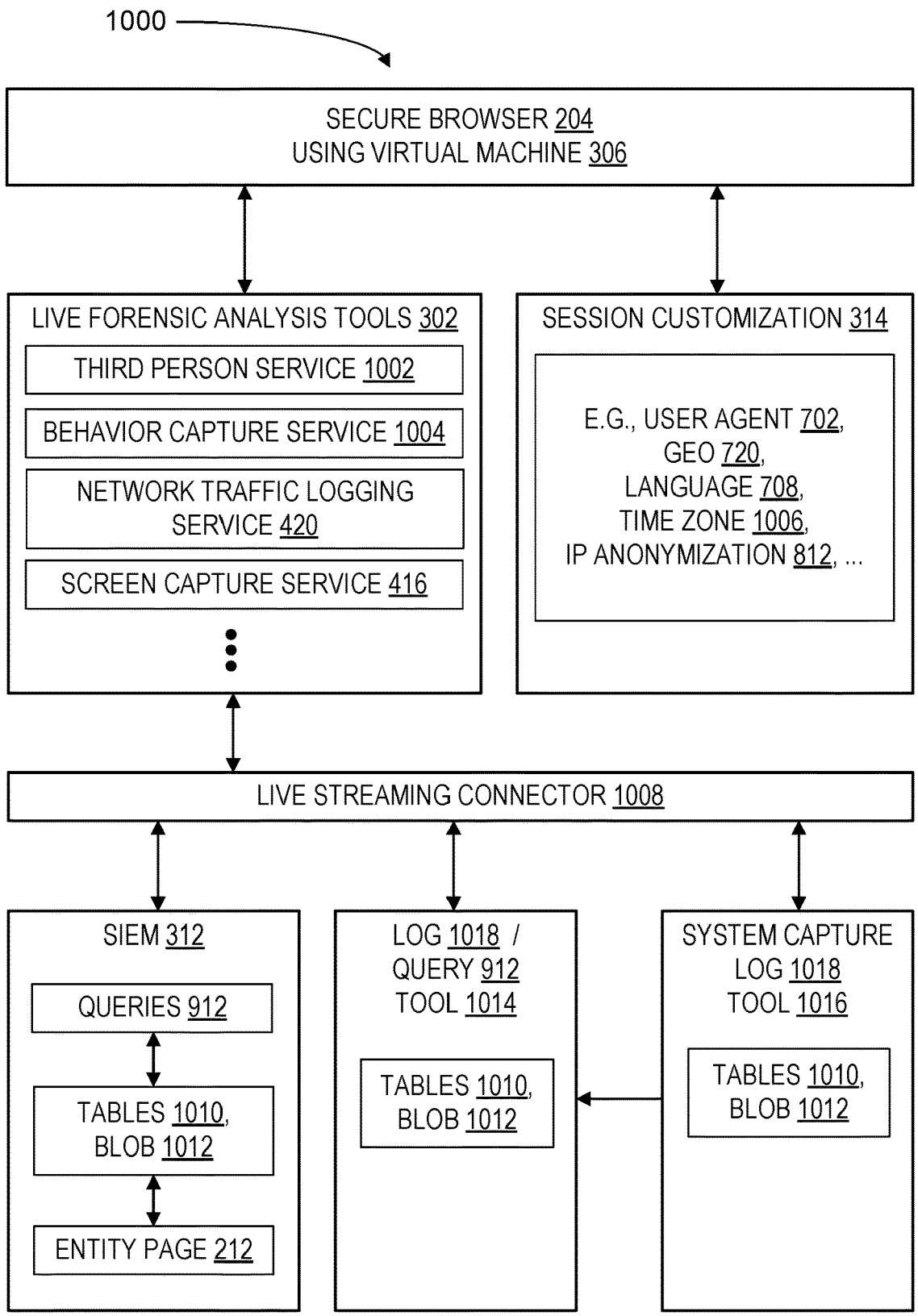
FIG. 10 is a data flow architecture diagram of an example of a system that is equipped for live forensic browsing.

FIG. 10 shows an example architecture 1000 of an enhanced system 202. In this example, a browser 204 runs in a virtual machine or container 306 as a form of isolation. This browser 204 is enhance with live forensic browsing software 308, which may be embedded in the browser itself, or operate as a plugin or a him, for example. The live forensic browsing software 308 allows live communication of forensic data between the browser and forensic analysis tools 302. The forensic analysis tools 302 may include one or more third person services 1002, e.g., proxy 806 or anonymization 812 or IP address 714 reputation services. The forensic analysis tools 302 may include a behavior capture service 1004, e.g., a service that logs interactions 802 between user, browser, and attacker. As illustrated, other forensic analysis tools 302 may also be connected for live communication with the secure browser 204.

The illustrated architecture 1000 also includes sessions customization functionality 314, to obscure one or more of: the presence of the forensic browsing software 308, the presence of the forensic analysis tools 302, or the residency of the browser 204 in a virtual machine or container 306, for example. This aids forensic investigation by allowing (or even enticing) attackers 216 to behave 802 as if they have found a relatively unprotected system 102 with a naïve user 104. Customization 314 may be accomplished by changing, omitting, or adding session characteristic values 824 to make the set of externally detected values 824 more closely resemble those of the modeled unprotected system 102 and naïve user 104. For example, customization may alter user agent 702 information, geographic information 720, natural language usage 708, time zone information 1006, and other forensic data 310, by generating different values within an enhanced browser 204, by altering browser-generated values within the software 308 before it leaves the enhanced system 202, or by specifying routing through use of a proxy 806.

In the illustrated architecture 1000, the live forensic browsing software 308 includes a live streaming connector 1008 which transfers forensic data between the browser and forensic analysis tools 302, or between different forensic analysis tools 302, or both. Within a given forensic analysis tool 302, forensic data 310 may be stored within tables 1010, blobs 1012, or other data structures. To the extent that the SIEM's own logging, querying, or capture functionality is deemed insufficient, for example, additional tools 1014, 1016 may be connected via the live streaming connector 1008.

Some embodiments use or provide a functionality-enhanced system, such as system 202 or another system 102 that is enhanced as taught herein. In some embodiments, a system which is configured for live forensic browsing of a uniform resource locator (URL) 210, includes a digital memory 112, a browser 204, a security information and event management (SIEM) interface 304 to an interactive SIEM tool 312, and a processor 110 in operable communication with the memory. The processor 110 is configured to perform steps for live forensic browsing of a URL in a browsing session of the browser. The steps include (a) spoofing at least one externally detectable characteristic 218 of the browsing session 208, (b) collecting forensic data 310 from the browsing session while executing the browsing session, and (c) supplying at least a portion of the collected forensic data to the SIEM 312 via the SIEM interface 304 while executing the browsing session, thereby supporting interactive investigation of suspicious computational behavior 822 through a forensic analysis of live forensic data, said live forensic data being at least partially dependent on the URL and at least partially dependent on the spoofing.

In this context, the SIEM 312 is or at least includes a forensic analysis tool that (a) automatically ingests security event and information data, and (b) allows interactive examination of that data in one or more formats tailored for cybersecurity enhancement.

In this context, the "live" in "live forensic browsing" indicates the enhanced system 202 is collecting forensic data from the browsing session and is also supplying at least some of that data 310 to an interactive forensic tool (not a mere logger) outside the browser, all while executing the browsing session. Similarly, the "live" in "live forensic data" indicates the presence of forensic data from a currently executing browsing session.

In this context, a characteristic 218 is "externally detectable" relative to a system 202 when the characteristic can be programmatically detected outside the system, that is, detected automatically using software or hardware or both.

Some embodiments use a virtual machine for browser isolation. Containers are another a possible mechanism for browser isolation. Thus, in some embodiments the system 202 includes a virtual machine or container 306 and the browser 204 runs within the virtual machine.

Some embodiments support investigator 104 usage of a variety of forensic analysis tools while browsing. As noted herein, a SIEM 312 is itself a forensic analysis tool 302, and other tools 302 may also be used, either as functionality integrated into the SIEM or as separate tools from the SIEM per se. Thus, in some embodiments the system 202 includes an interface 304 to at least one of the following forensic analysis tools: a malware detection service 406, a phishing detection service 412, a screen capture service 416, a network logging service 420, a file detonation service 424, or a URL detonation service 428.

In some embodiments, a wide variety of forensic data 310 may be collected and sent to the SIEM while browsing. Some examples of collectable forensic data 310 include URLs 210 (e.g., source 502, final destination 504, redirect 506, referrer 510, and request 508 URLs), a domain 520 of a URL, IP address(es) 714, 716, text 526 (e.g., in a body of a final destination landing page, appearing on a button or on other user interface element), an image 512 (e.g., logo, background image, full screen capture of final destination landing page or other page), a hash representation 518 (e.g., from an image, text, or other data), HTTP or HTTPS data (e.g., header 528, content), certificate information (for final destination page, server, or other location), and various non-network data 526 (e.g., text on a page, form elements, a DOM structure).

Thus, in some embodiments the forensic data 310 supplied to the SIEM 312 includes at least one of the following: a source URL 502 or portion 522 thereof, a destination URL 504 or portion 522 thereof, a redirect URL 506 or portion 522 thereof, a referrer URL 510 or portion 522 thereof, a request URL 508 or portion 522 thereof, an image 512 referenced by a web page, an image name 514, a screen capture 414, a session ID 516, a hash value 518, a domain name 520, an HTTP header 528, an HTTPS header 528, non-network data 526, or a timestamp 524.

In some embodiments, the system 202 includes a session data translator 318 which upon execution translates browsing session data 320 from a tree structure 602 into a table structure 604 for ingestion by the SIEM 312.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, sequences, data structures, or functionalities for instance, and may otherwise depart from the examples provided herein.

Processes (a.k.a. Methods)

Figure 11:
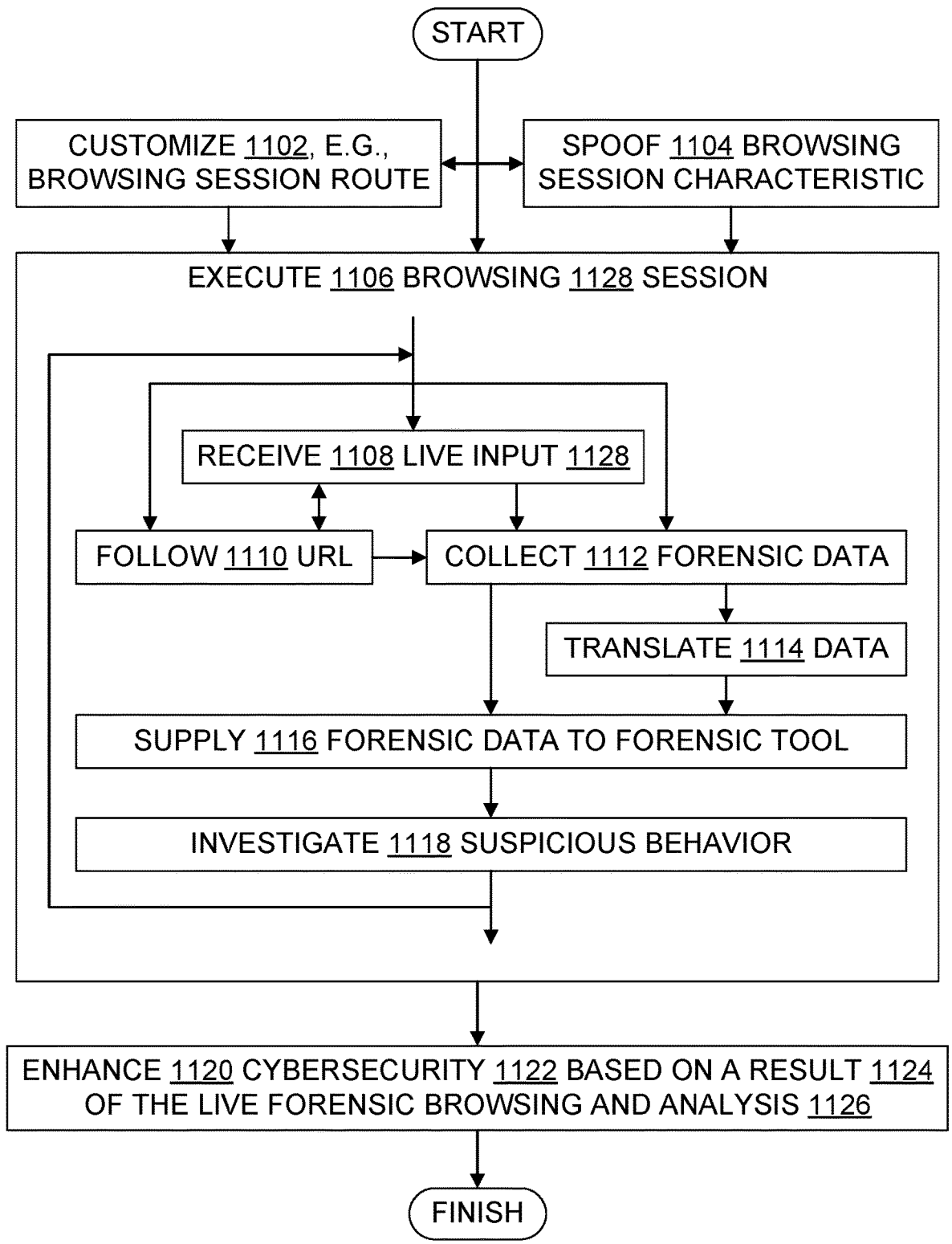
FIG. 11 is a flowchart illustrating steps in some live forensic browsing methods.
Figure 12:
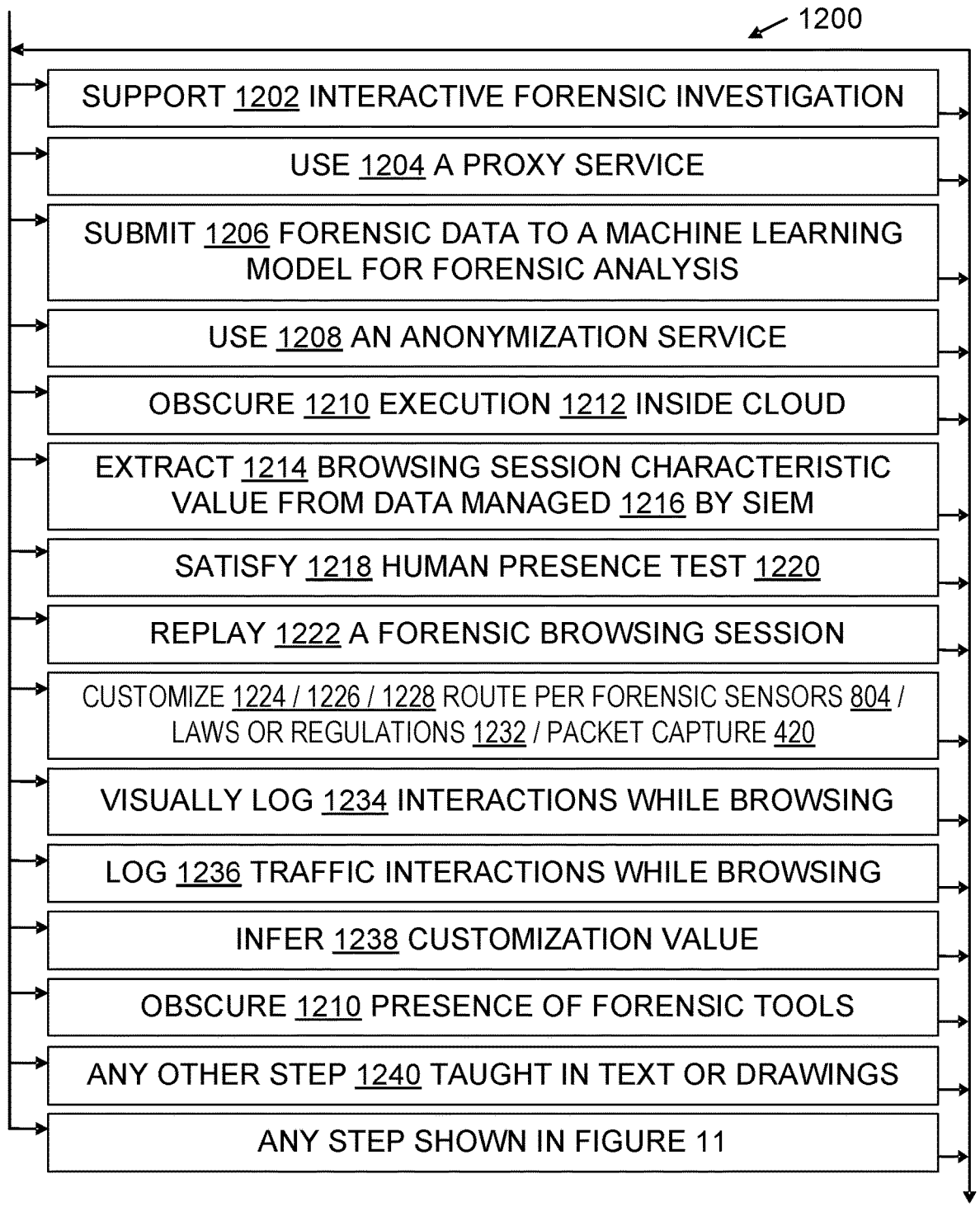
FIG. 12 is a flowchart further illustrating steps in some live forensic browsing methods.

FIG. 11 illustrates a family of methods 1100 that may be performed or assisted by an enhanced system, such as system 202 or another functionality 206 enhanced system as taught herein. FIG. 12 further illustrates live forensic browsing methods (which may also be referred to as "processes" in the legal sense of that word) that are suitable for use during operation of a system which has innovative functionality taught herein. FIG. 12 includes some refinements, supplements, or contextual actions for steps shown in FIG. 11. FIG. 12 also incorporates steps shown in FIG. 11.

Technical processes shown in the Figures or otherwise disclosed will be performed automatically, e.g., by an enhanced system 202 or software component thereof, unless otherwise indicated. Processes may also be performed in part automatically and in part manually to the extent action by a human administrator or other human person is implicated, e.g., in some embodiments a human investigator 104 may specify which one or more forensic analysis tools 302 will receive live forensic data 310 during a particular browsing session 208. No process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 11 and 12. Steps may be performed serially, in a partially overlapping manner, or fully in parallel. In particular, the order in which flowchart 1100 action items or flowchart 1200 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for live forensic browsing of a uniform resource locator (URL), including the following automatic steps: executing 1106 a browsing session of a browser in a computing system 202, the browser receiving 1108 live input 1128, 802 from a human user during the browsing session, automatically collecting 1112 forensic data from the browsing session during the browsing session, and automatically supplying 1116 at least a portion of the collected forensic data to a security information and event management tool (SIEM) during the browsing session as live forensic data. Thus, the method supports interactive investigation 1118 of suspicious computational behavior through a forensic analysis 1126 of the live forensic data, said live forensic data being at least partially dependent on the URL and at least partially dependent on the live input 1128.

With particular attention to spoofing 1104, some of the main categories of characteristics 218 that may be spoofed include the kind of browser (e.g., Chrome™, Safari®, Firefox®, etc.; Chrome is a mark of Google, Inc., Safari is a mark of Apple, Inc., Firefox is a mark of The Mozilla Foundation), the browser's communicated context (e.g., operating system, geolocation, timestamp, kinds of markup enabled), and the browser's software and hardware environment (e.g., plugins enabled, physical memory size, hard drive size, CPU, kind of device such as phone or tablet, etc.). Thus, in some embodiments the method includes spoofing 1104 at least one of the following externally detectable characteristics 218 of the browsing session: a browser user agent 702 or portion 704 thereof, a browser language preference 708, a browser setting 712, a compatibility indication 710, a geolocation 720, an IP address 714 or IP address range 716, an installation status 724 of a browser plugin 726, or a physical characteristic 728 of the computing system 202.

As another example, some embodiments spoof 1104 a referrer URL of the browsing session. An attacker may have expectations on where the traffic will originate based on who they attacked and how (e.g., a broadly distributed attack or a targeted attack). An embodiment may spoof so the attacker sees what they expected when they check where the perceived victim's reply or response traffic (apparently but not actually) originates.

In some embodiments, SIEM data is used to infer values 824 that are then used in spoofing 1104. Thus, the method 1200 may include extracting 1214 a browsing session characteristic value from data that is managed by the SIEM, and spoofing 1104 an externally detectable characteristic of the browsing session to match the extracted characteristic value. For example, user agent, geolocation, time zone, and other data may be automatically extracted 1214 and then re-used as spoof values.

With some embodiments, security analysts may use live forensic browsing to safely see past CAPTCHAs; one example scenario is discussed elsewhere herein. By safely including live input 1128, 802 in the interactions 802 and by obscuring 1210 the presence of a human analyst, an embodiment may facilitate forensic analysis 1126 of cyberattacks 400 that test for human presence so they can hide during a fully automated forensic analysis. In some embodiments, at least a portion of the live input 1128 satisfies a programmed test 1220 for human presence, and the method collects 1112 forensic data 310 about suspect behavior which occurs as a result of satisfying the test for human presence.

Some embodiments include interaction recording or logging functionality, in some cases with replay functionality. In some, live browsing visual logging 1234 includes, e.g., capturing screen shots or video. In some, live browsing network logging 1236 traffic interactions includes packet capture, e.g., pcap logging, or use of packet sniffers generally. Thus, in some embodiments, the method includes at least one of the following: visually logging 1234 interactions during the browsing session, logging 1236 traffic interactions during the browsing session, or replaying 1222 a forensic browsing session.

Unless stated otherwise, "customizing" herein includes spoofing or otherwise enhancing the collection of forensic data. Conversely, some embodiments use or include customization other than spoofing. For example, assume that a security operations center (SOC) analyst works for a global company and a client company residing in the United Kingdom (UK) is attacked. The company may want to visit and collect data on an URL involved in the attack from a United States (US) endpoint if the US has more favorable laws governing actions the company can take as it gathers data on the attack.

More generally, in some embodiments the method includes routing customization 314 of the browsing session in at least one of the following ways: customization 1224 to favor a route that contains specified forensic sensors 804, customization 1226 to favor a route based on applicable privacy, data collection, or compliance laws or regulations 1232, or customization 1228 to favor a route in a jurisdiction that allows packet capture and inspection.

In some embodiments, spoofing to obscure forensic analysis involves spoofing 1104 at least one of the following externally detectable characteristics of the browsing session: connection bandwidth 808, connection latency 818, or connection throughput 814. These connection characteristics may also be referred to as "communication characteristics", or as "network characteristics".

Some embodiments supply forensic data to a machine learning model to facilitate forensic analysis. In this context, "forensic analysis" includes gathering information or performing investigation to aid understanding of how software processes or mechanisms operate, with one example of forensic analysis being determining whether a URL is bad (e.g., a phishing site or malware serving site). In some situations, executing 1106 the browser session includes following 1110 the URL, and the method 1200 includes submitting 1116, 1206 a data result 310 of following the URL to a machine learning model 816 for forensic analysis 1126.

Some embodiments use of a proxy service 806 for spoofing, e.g., the

Proxify® service or another proxy service (mark of UpsideOut, Inc.). In some, the method includes spoofing 1104 a location characteristic of the browsing session by using a proxy service or an anonymization service or both. In this context, a "location characteristic" includes geolocation, IP address, IP address range, or a domain name or portion thereof.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as live forensic browsing software 308, a session data translator 318, forensic analysis tools 302, virtual machines and containers 306, forensic data 310, session data formats 600, and externally detectable characteristics 218, in the form of data 118 and instructions 116, read from a removable storage medium 114 and/or another source such as a network connection, to form a configured storage medium. The configured storage medium 112 is capable of causing a computer system 102 to perform technical process steps for live forensic browsing, as disclosed herein. The Figures thus help illustrate configured storage media embodiments and process (a.k.a. method) embodiments, as well as system and process embodiments. In particular, any of the process steps illustrated in FIG. 11 or 12, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for live forensic browsing of a uniform resource locator (URL). This method includes: executing 1106 a browsing session of a browser in a computing system, including at least following 1110 the URL; customizing 1102 at least one externally detectable characteristic of the browsing session; automatically collecting 1112 forensic data from the browsing session during the browsing session; and automatically supplying 1116 at least a portion of the collected forensic data to a security information and event management tool (SIEM) during the browsing session as live forensic data. Accordingly, the storage medium supports interactive investigation 1118 of suspicious computational behavior through a forensic analysis 1126 of the live forensic data, said live forensic data being at least partially dependent on the URL and at least partially dependent on a result of the customizing.

In some embodiments, the browsing session executes 1106, 1212 in a cloud 810, and the customizing 1102 obscures 1210 use of the cloud for execution of the browsing session. Customization may help deceive attackers by setting parameters to increase the chances of navigating to a malicious site.

In some, customizing 1102 generally, or spoofing 1104 in particular, are accomplished in part by appending a query parameter to a URL, which then directs the enhanced browser which characteristics 218 are being customized in which way. For example, user agent 702 customization instructions may append a query parameter such as chrome-linux or safari-iphone (iPhone is a mark of Apple, Inc.; other mark owners noted elsewhere herein). Similarly, to browse out of a different IP, a parameter such as proxy-location=Spain may be appended. In some embodiments, the spoofed location value 824 can be a continent name, a country name, a two-letter country code, or a city name.

In some embodiments, the method includes translating 318 collected forensic data into a SIEM ingestion format 604.

Some embodiments, use SIEM data to infer values that are then used in customizing the browser session. In some, the method includes customizing at least two browsing session 208 characteristics 218 based on data 118, 1018 that is managed by the SIEM.

In some embodiments, the URL is part of a phishing attack 410 or part of a malware delivery attack 404 or both.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some Additional Observations About Challenges Faced

When they investigate malicious URLs 210 such as phishing URLs, enterprise security analysts 104 sometimes work with their information technology (IT) departments to create specialized infrastructure to help ensure that their analysis of weaponized links does not inadvertently compromise their enterprise. In some embodiments taught herein, secure forensic browsing provides a sandbox-isolated environment in a cloud outside the enterprise network, that enables threat researchers and security analysts to safely navigate to and examine websites 212. Moreover, during the live session, the embodiment can collect forensic data to permit analyst insights (e.g., to help analyze the URL, capture redirects, and analyze the landing page) from an entire browsing session.

A technical challenge for threat researchers and security analysts 104 is how to handle weaponized URLs safely from within the enterprise. It is generally unwise for threat researchers and security analysts to visit live malicious links from devices 102 connected to their corporate network 108. But creating specialized IT infrastructure for threat investigation can be cumbersome, costly to maintain, and still pose a significant risk to the corporate network when an isolation measure fails or an attacker 216 manages to circumvent isolation measures.

Live forensic browsing tools and techniques taught herein help solve this technical problem, in part by enabling threat researchers and security analysts to safely open and interact with weaponized links within an isolated sandbox environment in the cloud 810 that includes forensic tools 302. Unlike alternatives, this forensic environment is completely disconnected from the corporate network. The investigator can examine the website in an air-gapped environment, customize 1102 parameters for the browsing session (e.g., IP anonymization to deceive the attacker), execute inline analysis tools 302 designed to shed light on the intent of the website (e.g., URL detonation) and collect 1112 and log data and indicators (e.g., destination URLs, redirect URLs, images) directly into a SIEM 312 so that current forensic data can be used to hunt for other potential compromises inside the enterprise. Live forensic browsing can support live analysis 1126 while browsing 1110 to a webpage and provide live data collection to a SIEM so the data 310 can be applied for broader enterprise threat hunting and investigation activities. A suitably equipped analyst may automate the collection of indicators of compromise (IOCs) directly into a SIEM and thus enable hunting queries and rule-based alerts using those IOCs.

An Example Live Forensic Browsing Phishing Site Detection Scenario

Bean is a SOC analyst using a SIEM. While investigating an alert triggered on a malicious IP, Bean notices there is a URL associated with that IP, and wants to learn more about that URL. But Bean recognizes the importance of being careful, because it is not clear whether the URL will download malware payloads 402 or go to an unsafe page. In a combined browser-SIEM tool interface 900, Bean selects "Safe Browse" and sets an option to open the link in an isolated session 208. Note that the teachings herein extend beyond isolated browsing per se in some embodiments, e.g., by capturing live session data from isolated browsing and supplying that live session data to an integrated SIEM.

Live capture 910 in the SIEM 312 begins logging activity from the browsing session. While browsing the suspicious site, Bean suspects this is a phishing site, and this suspicion is confirmed using integrated forensic tools 302. Bean then takes the URL and redirect URLs that were captured 1112 in the logging and creates hunting queries 912 to see if any other users also browsed to this site. If they did, Bean will follow up to check their devices for malware.

An Example Live Forensic Browsing CAPTCHA Scenario

Bean is presented with a login screen during a live forensic browsing session, with the live forensic browsing software 308 configured to allow navigation to suspect pages 212. Part of the login process is a CAPTCHA, which is displayed in the browser window 906. When Bean solves the CAPTCHA, a final landing page is displayed. However, forensic analysis 1126 reveals that this landing page is a phishing page.

If the live forensic browsing software 308 is configured instead to not allow navigation to suspect pages 212, then when a user 104 starts entering credentials, the integrated SIEM detects behavior indicating a phishing page, notifies the integrated browser, and the browser blocks further user input that would lead to the phishing page.

Some Additional Observations About Customization

With regard to inferring 1238 customization values from SIEM data, the logs that contain URLs sometimes contain other information related to the URL. For example, for a request URL that originated from a device inside a company, the logs 1018 can contain information that enables a system 202 to infer how to automatically configure the session. For example, the source IP from which the navigation to the URL originated provides a basis from which the system 202 can infer region or GEO with a whois lookup, and the log will often also record the user agent associated with a visitation to the URL and the device time zone associated with the visitation to the URL. Other devices 102 such as a firewall, IDS, or IPS may also provide logs 1018 from which customization values can be inferred 1238. Inferences may be made from a network trace or other log data 1018 imported to the SIEM from which a forensic browsing session is initiated, such as inferences based on the device that was used to visit the URL, inferences based on the browser used to visit the URL, and inferences made from network indicators (e.g., source IP associated with the visitation to the URL).

With regard to customizing 1102 traffic routing for the live forensic browsing session by an analyst, an embodiment may be configured to route traffic through jurisdictions with favorable data collection allowances, to route the traffic through infrastructure where a customer has other sensors 804 setup, or to route through jurisdictions that allow inspection of the traffic (e.g., full PCAP or other full packet capture).

Also, customizing 1102 may adjust browser bandwidth and latency so the visit appears to an attacker to have the expected connection speed of the apparent victim. For instance, traffic from a corporate network may be different than mobile network traffic, and spoofed geographic distance may be taken into account.

Some Additional Observations About Replay

With regard to replaying 1222 a forensic browsing session 208, some embodiments include functionality for recording or logging interactions 802. Some support save and replay packet capture for an entire session 208 or for a selected portion thereof. Some log step by step interaction data 320, such as screen shots of each page after each click or a video of the entire session. Some support PCAP logging for later inspection (e.g., to replay a fiddler trace) that enables contrasting situations where the attacker delivered the malicious payload or page with situations where this delivery did not occur. When a malicious website is down, an analyst can see how the website responded when it was up. Some allow an analyst to step through interactions in the browser itself by incorporating screen shots of each page after each click. Some use recorded traffic data of an apparently naive visit to a malicious site to mimic a visitation the attacker site is expecting, e.g., by ensuring the browser's object model and script return data the attacker is expecting with regard to installed plugins, controls, settings, and so on. This facilitates forensic investigation of a site that only delivers a payload 402 to a particular kind of device 102 running a particular user agent, for example.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as isolating browsers 204 in virtual machines 306 or containers 306, collecting 1112 web browsing session 208 forensic data 310, translating 1114 data formats 600, supplying 1116 forensic data to a SIEM 312 in a live stream, detonating 422 files 214, detonating 426 URLs 210, and spoofing 1104 web browsing session 208 externally detectable characteristics 218, each of which is an activity deeply rooted in computing technology. Some of the technical mechanisms discussed include, e.g., virtual machines and containers 306, web browsers 204, SIEMS 312 and other digital data 310 forensic analysis tools 302, data 320 format 600 translators 318, and user interfaces 900. Some of the technical effects discussed include, e.g., forensic browsing with live data 320, safe detonation 422 of suspect files 214, safe detonation 426 of suspect URLs, deception of attackers 216 via obscured 1210 indicators of forensic activity, inferred 1238 values for use in such obscuring 1210, and customized 1224, 1226, 1228 routing of network communications. Thus, purely mental processes are clearly excluded. Other advantages based on the technical characteristics of the teachings will also be apparent to one of skill from the description provided.

Some embodiments described herein may be viewed by some people in a broader context. For instance, concepts such as collection, data, deception, harm, and isolation may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to safely and effectively investigate suspect URLs and websites. Other configured storage media, systems, and processes involving collection, data, deception, harm, or isolation are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating system environments, feature examples, software processes, development tools, identifiers, data structures, data formats, notations, control flows, naming conventions, or other implementation choices described herein. Any apparent conflict with any other patent disclosure, even from the owner of the present innovations, has no role in interpreting the claims presented in this patent disclosure.

Note Regarding Hyperlinks

This disclosure may contain various URIs, URLs, hyperlinks, IP addresses, email addresses, or other items which might be considered browser-executable codes. These items are included in the disclosure as a courtesy or as an example in and of themselves, rather than being included to reference the contents of the websites or files that they identify as necessary support for the description of embodiments. Applicant does not intend to have these URIs, URLs, hyperlinks, IP addresses, email addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CAPTCHA: Completely Automated Public Turing test to tell Computers and Humans Apart
CD: compact disc
CPU: central processing unit
CSV: comma-separated values
DOM: document object model
DVD: digital versatile disk or digital video disc
FPGA: field-programmable gate array
FPU: floating point processing unit
GPU: graphical processing unit
GUI: graphical user interface
HIDS: host intrusion detection system
IaaS or IAAS: infrastructure-as-a-service
ID: identification or identity
IDS: intrusion detection systems
IoT: Internet of Things
IP: internet protocol
IPS: intrusion prevention system
LAN: local area network
NIDS: network intrusion detection system
OS: operating system
PaaS or PAAS: platform-as-a-service
RAM: random access memory
ROM: read only memory
SIEM: security information and event management; also refers to tools which provide security information and event management; may also be referred to as SEIM (security event and information management)
TCP: transmission control protocol
TPU: tensor processing unit
UDP: user datagram protocol
UEFI: Unified Extensible Firmware Interface
URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, or otherwise utilize the resource.

Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Live forensic browsing operations such as collecting 1112 session data 320, translating 1114 data formats, feeding 1116 data in real time to a SIEM 312, and many other operations discussed herein, are understood to be inherently digital. A human mind cannot interface directly with a CPU or other processor, or with RAM or other digital storage, to read and write the necessary data to perform the live forensic browsing steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as browsing, customizing, detonating, executing, extracting, inferring, logging, obscuring, receiving, replaying, spoofing, submitting, supplying, translating, (and browses, browsed, customizes, customized, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., an analyst or other user of an enhanced system 202

106 peripherals 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, autocompletion software, simulators, fuzzers, repository access tools, version control tools, optimizers, collaboration tools, other software development tools and tool suites (including, e.g., integrated development environments), hardware development tools and tool suites, diagnostics, enhanced browsers, and so on 124 applications, e.g., word processors, web browsers, spreadsheets, games, email tools, commands 126 display screens, also referred to as "displays"

128 computing hardware not otherwise associated with a reference number 106, 108, 110, 112, 114

202 enhanced computers, e.g., computers 102 (nodes 102) enhanced with live forensic browsing functionality 204 browser 206 live forensic browsing functionality, e.g., functionality which does at least one of the following: feeds forensic data from a browser to an interactive forensic analysis tool during a browsing session (logging alone does not satisfy the "interactive" criterion), customizes one or more browsing session or browser characteristics to deceive attackers by obscuring the use of forensic analysis, extracts values from SIEM data for use in such customization, conforms with the FIG. 10 architecture, conforms with the FIG. 11 flowchart, translates session data from tree to table format for SIEM ingestion, or otherwise provides capabilities first taught herein 208 browsing session 210 URL; may also refer to a portion of a URL 212 web page or website 214 file generally; may also refer to blob, database, chunk, or other mechanism or structure containing data 118

216 cyberattacker, e.g., a person or automation who is acting within a network or a system beyond the scope of the authority (if any) granted to them by the owner of the network or system; may be external or an insider; may also be referred to as an "adversary"

218 externally detectable characteristic of a browsing session; unless stated otherwise, refers both to characteristics set by the browser itself which are detectable by an attacker and to characteristics of the browser's environment that are detectable by an attacker 300 live forensic browsing, e.g., performing browsing while feeding a forensic tool some forensic data that is generated by that browsing 302 forensic analysis tool 304 interface 306 virtual machine; as to teachings herein 306 also refers to a container although there are some differences, e.g., a virtual machine is a computing construct which provides hardware virtualization and includes an operating system, whereas a container is a computing construct which provides user space virtualization and does not itself include an operating system but is nonetheless reliant upon an operating system to execute 308 live forensic browsing software 310 forensic data, e.g., values of items shown in FIG. 5 or FIG. 7; may be recorded in or extracted from one or more logs, namely automatically created records of certain events in a computing system; may be in a syslog format, or another format; logs may include traffic logs from firewalls, security logs from workstations, security logs from servers, and logs provided to or generated by security information and event management (SIEM) tools; SIEMs may consolidate logs that were generated by one or more of a firewall, workstation, server, router, NIDS, HIDS, or other devices and tools; logs may overlap, e.g., the same events may appear in different logs; logs may also be obtained from sources that are not listed among these examples; an event may also be referred to as an "entry" or set of entries in a log or as data 118, 310

312 SIEM; may also be referred to as "SIEM tool" or "SEIM" or "SEIM tool"

314 browsing session customization, e.g., spoofing a value normally generated by a browser or selecting a value (e.g., route) normally used by a browser for communication; 314 also refers to functionality that provides such customization 316 spoofing a value normally generated by a browser, that is, changing the normal or default value to a different value, such as one that obscures the presence of forensic analysis tools; this is an example of spoofing 1104

318 session data format translator; may operate in a single direction (e.g., from browser tree format to SIEM table format) or may be bidirectional; 318 also refers to an act of translation by such a translator and to a translation result produced by such a translator 320 session data, e.g., data illustrated in FIG. 5 which is generated by browsing; session data is an example of forensic data 310

400 cyberattack generally 402 malware 404 malware cyberattack, e.g., an attack which installs or executes malware 406 malware attack detection service, e.g., a tool or process which detects a malware attack or assigns circumstances a likelihood of being subject to a malware attack 408 phishing 410 phishing cyberattack, e.g., an attack which includes phishing 412 phishing attack detection service, e.g., a tool or process which detects a phishing attack or assigns circumstances a likelihood of being subject to a phishing attack 414 screen capture 416 screen capture service (tool or process)

418 packet; may also be referred to as "traffic"

420 packet capture process or tool, or other network traffic logging service; reference numeral 420 also refers to the act of capturing a packet 422 file detonation, e.g., opening a file with an application or loading a file onto a system 102, e.g., a PDF file is detonated by loading it into an application designed to read PDF files 424 file detonation service, e.g., tool or process that detonates a file inside a sandbox or other secured location to reduce risk to a user's system and its data 426 URL detonation, e.g., following a link, navigating online to a location specified by an URL; this allows an embodiment or other system to gather information about the results of following the URL 428 URL detonation, e.g., tool or process that detonates a URL inside a sandbox or other secured location to reduce risk to a user's system and its data 502 source URL 504 destination URL 506 redirect URL 508 request URL 510 referrer URL 512 image generally 514 image name 516 session ID 518 hash value 520 domain name 522 domain name, path, query parameters, or another portion of a URL 524 timestamp 526 non-network data, e.g., data generated at a network endpoint but not used for routing packets 528 HTTP or HTTPS header 702 browser user agent (a piece of software in a browser)

704 browser user agent information, e.g., specifying kind of browser 706 current browser natural language 708 browser natural language preference or default 710 compatibility information, e.g., which cybersecurity protocols are supported and how they are prioritized, which software versions are supported and how they are prioritized 712 browser setting which is subject to user control via configuration file or user interface menu 714 IP address (one or more)

716 IP address range (multiple addresses)

718 geolocation, e.g., country, continent, or region 720 direct or indirect geolocation information, e.g., code or other identifier; may be in the form of an IP address or range; may also be referred to as "egress geo" or simply as "geo"; may include, e.g., country, region, continent, time zone 722 route, e.g., sequence or partial sequence of routers taken or preferred for communication between a browser and a web server 724 installation status, e.g., present/not present/present but not enabled 726 browser plugin; may also be referred to as an "add-on"

728 physical characteristic of a system, e.g., amount of memory, kind of memory (RAM, ROM, removable or not, etc.), processor 110 type, number of processor cores, peripherals present, and so on; a cold boot process (from no power when power is turned on) normally checks for hardware and records the physical characteristics of the system that is being booted 800 aspect of an enhanced computing system 202 or a browsing session 208

802 interaction, e.g., user 104—browser 204 interaction, attacker 216—computing system 202 interaction, browser 204—translator 318 interaction, translator 318—forensic tool 302 interaction, browser 204—forensic tool 302 interaction, or any other interaction taught herein 804 forensic sensor, e.g., packet capture device, intrusion detection system, or any other device that gathers forensic data 806 proxy device or proxy service 808 communication bandwidth 810 cloud network; may also be referred to simply as a "cloud"

812 anonymization device or anonymization service; may include a proxy 806

814 communication throughput 816 forensic analysis machine learning model; may use or include one or more neural networks, deep neural networks, collaborative filters, decision trees, clustering, or other machine learning tools and techniques 818 communication latency 820 packet inspection tool or service; also refers to act of inspecting a packet 822 suspect behavior; may also be referred to as "suspicious behavior"; may include one or more indicators of compromise, for example 824 session characteristic value, e.g., a value of an item shown in FIG. 7 or FIG. 5

900 user interface for live forensic browsing software 308

902 address bar 904 browser tab 906 browser page display area 908 command button 910 input source identification, e.g., "live stream"

912 query history, e.g., list of time parameters, data source selections, data field values, or combinations of these and other filter or search parameters; 912 also refers to one or more individual queries 914 query results 1000 live forensic browsing architecture example 1002 third person service generally 1006 time zone information 1008 live streaming connector; may include, e.g., sockets, messages, signals, procedure calls, encoders, decoders, and other digital communication mechanisms 1010 table 1012 blob (binary large object)

1014 tool with functionality for logging or querying log or both 1016 tool with functionality for capturing or logging system information, as opposed to network information 1018 log or similar record of events or states or both 1100 flowchart; 1100 also refers to live forensic browsing methods illustrated by or consistent with the FIG. 11 flowchart 1102 customize an externally detectable characteristic of a browsing session, e.g., by spoofing or by routing selection 1104 spoof an externally detectable characteristic of a browsing session 1106 execute a browsing session on a computing system 1108 receive live input from a human during a browsing session 1110 follow a URL; may also be referred to as following a link, clicking on a link, or detonating a link or URL 1112 collect forensic data, e.g., by tracking interactions or recording settings during a browsing session 1114 translate data between two formats 1116 supply forensic data directly or indirectly to a forensic tool 1118 investigate suspect behavior; it is expected this will involve human action 1120 enhance cybersecurity 1122 cybersecurity, e.g., confidentiality, integrity, availability, or privacy of digital data 1124 result of live forensic browsing, such as a conclusion about maliciousness, a customization, session data, or a log of interactions, to name a few of many possible examples 1126 forensic analysis 1200 flowchart; 1200 also refers to live forensic browsing methods illustrated by or consistent with the FIG. 12 flowchart (which incorporates the steps of FIG. 11)

1202 support interactive forensic investigation, as opposed to forensic investigation that relies entirely on data from a session 208 no longer underway 1204 use a proxy or proxy service 1206 submit data to a machine learning model, e.g., for training or for categorization 1208 use an anonymization service 1210 obscure the presence of forensic tools or actions to hide them from a cyberattacker 1212 execute within a cloud, e.g., in a virtual machine in a cloud 1214 extract a value from data managed 1216 by a STEM, e.g., by searching, parsing, and copying 1216 manage forensic data, e.g., by logging, sorting, searching, filtering, copying, or displaying the data 1218 satisfy a human presence test 1220 human presence test, e.g., a CAPTCHA or a reaction time test 1222 replay a browsing session 1224 customize routing to use or avoid forensic sensors 1226 customize routing to use or avoid particular optional legal or regulatory requirements (compliance with applicable mandatory requirements is presumed)

1228 customize routing to use or avoid packet capture capabilities 1232 laws or regulations 1234 log visual data 1236 log traffic data 1238 infer a session customization value 1240 any step discussed in the present disclosure that has not been assigned some other reference numeral

CONCLUSION

In short, the teachings herein provide a variety of live forensic browsing functionalities 206 which operate in enhanced systems 202. Cybersecurity 1122 is enhanced 1120, with particular attention to malware download attacks 404, phishing attacks 410, and other attacks perpetrated via browsers 204. In some embodiments potentially malicious uniform resource locators 210 and websites 212 are safely and effectively investigated 1118 through live forensic browsing 1200. Live data 320 from an isolated browser 204 feeds 1116 a security information and event management (SIEM) tool 312 and other forensic tools 302 during a browsing session 208, allowing investigator 104 to direct the browsing in response to analysis 1126 results 1124. Session data 320 may be translated 318 for SIEM 312 ingestion, e.g., from a tree format 602 into a table format 604. Browsing sessions 208 may be manually or automatically (via inference 1238) customized 1102 to obscure 1210 their forensic nature, by routing selection 1224, 1226, 1228, by bandwidth 808 or latency 818 adjustment 1210, or by spoofing 1104 externally detectable characteristics 218 such as geolocation 720, user agent information 704, time zone 1006, and language 708. Forensic activity 1118 by an investigator 104 may also be obscured 1210 from discovery by an attacker 216 as a result of spoofing 1104 the browser's context 218, such as plugin status 724 and host machine physical characteristics 728. Human presence tests 1220 that are relied on by attackers 216 to help hide their malicious behavior may be satisfied 1218 without sacrificing a targeted system's cybersecurity 1122 or an investigator's access to forensic tools 302.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 11 and 12 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system configured for live forensic browsing of a uniform resource locator (URL), the system comprising:
   a memory;
   a browser;
   a security information and event management (SIEM) interface to an interactive SI EM tool; and
   a processor in operable communication with the memory, the processor configured to perform steps for live forensic browsing of a URL in a browsing session of the browser, the method including (a) spoofing at least one externally detectable characteristic of the browsing session, (b) collecting forensic data from the browsing session while executing the browsing session, and (c) supplying at least a portion of the collected forensic data to the SIEM via the SI EM interface while executing the browsing session, thereby supporting interactive investigation of suspicious computational behavior through a forensic analysis of live forensic data, said live forensic data being at least partially dependent on the URL and at least partially dependent on the spoofing.

2. The system of claim 1, wherein the system comprises a virtual machine or a container and the browser runs within the virtual machine or the container.

3. The system of claim 1, wherein the system comprises an interface to at least one of the following forensic analysis tools:
   a malware detection service;
   a phishing detection service;
   a screen capture service;
   a network logging service;
   a file detonation service; or
   a URL detonation service.

4. The system of claim 1, wherein the forensic data supplied to the SIEM includes at least one of the following:
- a source URL or portion thereof;
- a destination URL or portion thereof;
- a redirect URL or portion thereof;
- a referrer URL or portion thereof;
- a request URL or portion thereof;
- an image referenced by a web page;
- an image name;
- a screen capture;
- a session ID;
- a hash value;
- a domain name;
- an HTTP header;
- an HTTPS header;
- non-network data; or
- a timestamp.

5. The system of claim 1, wherein the system further comprises a session data translator which upon execution translates browsing session data from a tree structure into a table structure for ingestion by the SIEM.

6. A method for live forensic browsing of a uniform resource locator (URL), the method comprising:
- executing a browsing session of a browser in a computing system;
- the browser receiving live input from a human user during the browsing session;
- automatically collecting forensic data from the browsing session during the browsing session; and
- automatically supplying at least a portion of the collected forensic data to a security information and event management tool (SIEM) during the browsing session as live forensic data;
- whereby the method supports interactive investigation of suspicious computational behavior through a forensic analysis of the live forensic data, said live forensic data being at least partially dependent on the URL and at least partially dependent on the live input.

7. The method of claim 6, further comprising spoofing at least one of the following externally detectable characteristics of the browsing session:
- a browser user agent or portion thereof;
- a browser language preference;
- a browser setting;
- a compatibility indication;
- a geolocation;
- an IP address or IP address range;
- an installation status of a browser plugin; or
- a physical characteristic of the computing system.

8. The method of claim 6, further comprising extracting a browsing session characteristic value from data that is managed by the SIEM, and spoofing an externally detectable characteristic of the browsing session to match the extracted characteristic value.

9. The method of claim 6, wherein at least a portion of the live input satisfies a programmed test for human presence, and the method collects forensic data about suspect behavior which occurs as a result of satisfying the test for human presence.

10. The method of claim 6, further comprising at least one of the following:
- visually logging interactions during the browsing session;
- logging traffic interactions during the browsing session; or
- replaying a forensic browsing session.

11. The method of claim 6, further comprising customizing routing of the browsing session in at least one of the following ways:
- customization to favor a route that contains specified forensic sensors;
- customization to favor a route based on applicable privacy, data collection, or compliance laws or regulations; or
- customization to favor a route in a jurisdiction that allows packet capture and inspection.

12. The method of claim 6, further comprising spoofing at least one of the following externally detectable characteristics of the browsing session: connection bandwidth, connection latency, or connection throughput.

13. The method of claim 6, further comprising spoofing a referrer URL of the browsing session.

14. The method of claim 6, wherein executing the browser session includes following the URL, and wherein the method further comprises submitting a data result of following the URL to a machine learning model for forensic analysis.

15. The method of claim 6, further comprising spoofing a location characteristic of the browsing session by using a proxy service or an anonymization service or both.

16. A computer-readable storage medium configured with data and instructions which upon execution by a processor cause a computing system to perform a method for live forensic browsing of a uniform resource locator (URL), the method comprising:
- executing a browsing session of a browser in a computing system, including at least following the URL;
- customizing at least one externally detectable characteristic of the browsing session;
- automatically collecting forensic data from the browsing session during the browsing session; and
- automatically supplying at least a portion of the collected forensic data to a security information and event management tool (SIEM) during the browsing session as live forensic data;
- whereby the storage medium supports interactive investigation of suspicious computational behavior through a forensic analysis of the live forensic data, said live forensic data being at least partially dependent on the URL and at least partially dependent on a result of the customizing.

17. The storage medium of claim 16, wherein the browsing session executes in a cloud, and the customizing obscures use of the cloud for execution of the browsing session, thereby helping deceive cyberattackers.

18. The storage medium of claim 16, wherein the method further comprises translating collected forensic data into a SIEM ingestion format.

19. The storage medium of claim 16, further comprising customizing at least two browsing session characteristics based on data managed by the SIEM.

20. The storage medium of claim 16, wherein the URL is part of a phishing attack or part of a malware delivery attack or both.

* * * * *